United States Patent
Klomp

(10) Patent No.: US 9,151,660 B2
(45) Date of Patent: Oct. 6, 2015

(54) METHOD FOR VALIDATION OF PHARMACEUTICAL FORMULATION COMPOSITION WEIGHT

(71) Applicant: Paul P. Klomp, Sugar Land, TX (US)

(72) Inventor: Paul P. Klomp, Sugar Land, TX (US)

(73) Assignee: PROFESSIONAL COMPOUNDING CENTERS OF AMERICA (PCCA), Houston, TX (US)

( * ) Notice: Subject to any disclaimer, the term of this patent is extended or adjusted under 35 U.S.C. 154(b) by 207 days.

(21) Appl. No.: 13/900,341

(22) Filed: May 22, 2013

(65) Prior Publication Data

US 2014/0351250 A1    Nov. 27, 2014

(51) Int. Cl.
| | | |
|---|---|---|
| G06F 7/00 | (2006.01) | |
| G06F 17/30 | (2006.01) | |
| G01G 17/00 | (2006.01) | |
| G01G 15/00 | (2006.01) | |

(52) U.S. Cl.
CPC .............. *G01G 17/00* (2013.01); *G01G 15/006* (2013.01)

(58) Field of Classification Search
None
See application file for complete search history.

(56) References Cited

U.S. PATENT DOCUMENTS

| | | | | |
|---|---|---|---|---|
| 7,395,963 B2 * | 7/2008 | Silverbrook et al. | ......... | 235/385 |
| 7,444,197 B2 * | 10/2008 | Popp | ............................. | 700/110 |
| 7,801,642 B2 * | 9/2010 | Ansari et al. | ................... | 700/240 |
| 8,224,483 B1 * | 7/2012 | Ansari et al. | ................... | 700/240 |
| 2009/0018865 A1 * | 1/2009 | Earnest | ............................. | 705/2 |
| 2009/0267740 A1 | 10/2009 | Pizzuto | | |
| 2009/0318564 A1 * | 12/2009 | Frenkel et al. | ................ | 514/657 |
| 2011/0046770 A1 | 2/2011 | Popp | | |

FOREIGN PATENT DOCUMENTS

EP    1839121 A2    3/2007

* cited by examiner

*Primary Examiner* — Tony Mahmoudi
*Assistant Examiner* — Tuan A Pham
(74) *Attorney, Agent, or Firm* — Barnes & Thornburg LLP; Thomas J. McWilliams; Edward F. Behm, Jr.

(57) ABSTRACT

A method for validating pharmaceutical compositions' weight is disclosed. The method may involve a pharmaceutical composition weight validation system, which may include a pharmaceutical manufacturing process, a barcode scanning, weighing the pharmaceutical compositions with a pharmaceutical balance, sending the barcode scanning and weight information to a database, and having a user accessing the information through a user interface. Additionally, the method for validating pharmaceutical compositions' weight may include entering inventory into the system, formulating the batch, storing weight information, manufacturing the batch, assigning and printing a barcode on the pharmaceutical products, scanning the barcode, weighing the pharmaceutical compositions, populating and storing the weight data, checking if weight is correct in pharmaceutical compositions, and correcting the weight of pharmaceutical compositions.

20 Claims, 2 Drawing Sheets

METHOD FOR VALIDATION OF PHARMACEUTICAL FORMULATION COMPOSITION WEIGHT

CROSS REFERENCE TO RELATED APPLICATIONS

N/A

BACKGROUND

1. Field of the Disclosure

The present disclosure relates generally to pharmaceutical operations, and more specifically to a method for validating weight in pharmaceutical compositions.

2. Background Information

In order to fulfill patient prescriptions, pharmacies stock and manage an extensive inventory of pharmaceutical products. These products are packaged in pharmaceutical product containers including any suitable type of package such as bottles, boxes, and bags, among others. To keep track of the different items in inventories, as well as for reducing number of medication errors in hospitals and healthcare centers, the FDA has specified that the packaging of all human drugs be labeled with a linear bar code including the National Drug Code (NDC), number that serves as a universal product identifier. This 10-digit code identifies the labeler/vendor, product, trade package size, the specific strength, the dosage, and the formula for a specific firm. These barcodes exhibit benefits such as improving operational efficiency, saving time for taking inventory, reducing errors, and cutting inventory costs.

Generally, after scanning barcodes from pharmaceutical compositions, these are weighed in pharmaceutical balances, after which a pharmacist may print a weight receipt according to the weight measured by the balance. Afterwards, this weight is hand-typed into the system, but because the system does not ensure that the pharmaceutical composition has the correct weight, the process may continue without any automatic weight validation process. Additionally, hand-typing the weight of the pharmaceutical compositions may lead to type-off mistakes, and consequently quality and monetary losses. Quality control and efficiency of pharmaceutical operations are considered to be a major concern.

SUMMARY

The present disclosure relates to a method for validating pharmaceutical compositions' weight. The method may involve a pharmaceutical composition weight validation system, which may include a pharmaceutical manufacturing process, a barcode scanning, weighing the pharmaceutical compositions with a pharmaceutical balance, sending the barcode scanning and weight information to a database, and having a user accessing the information through a user interface. Additionally, the method for validating pharmaceutical compositions' weight may include entering inventory into the system, formulating the batch, storing weight information, manufacturing the batch, assigning and printing a barcode on the pharmaceutical products, scanning the barcode, weighing the pharmaceutical compositions, populating and storing the weight/balance data, checking if weight is correct in pharmaceutical compositions, and correcting the weight of pharmaceutical compositions.

After scanning the pharmaceutical compositions, the method may include weighing the pharmaceutical compositions and may populate and store this data in the database for a weight check to be performed. If the pharmaceutical compositions measured weight does not match the predetermined weight, the method may include correcting the weight by adding or removing quantities of chemicals to the pharmaceutical composition, improving accuracy and efficiency of quality control. In addition, after weighing pharmaceutical compositions, balance information, including last calibration, date/time, and the serial number of the balance, are also stored in the database, which may assist in improving pharmaceutical compositions' traceability.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure.

DETAILED DESCRIPTION

Figure 1:
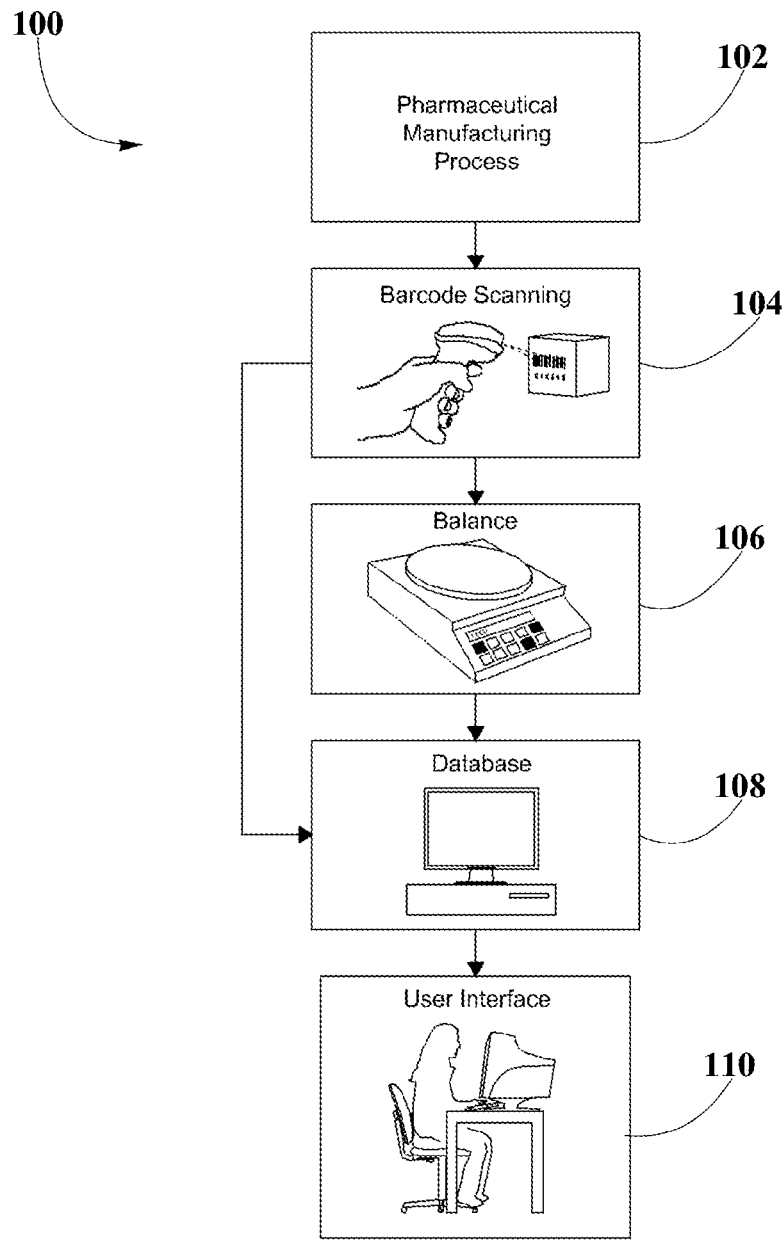
FIG. 1 is a block diagram of a pharmaceutical composition weight validation system, according to an embodiment.

In the following detailed description, reference is made to the accompanying drawings, which form a part hereof. In the drawings, which are not to scale or to proportion, similar symbols typically identify similar components, unless context dictates otherwise. The illustrative embodiments described in the detailed description, drawings and claims, are not meant to be limiting. Other embodiments may be used and/or other changes may be made without departing from the spirit or scope of the present disclosure.

Definitions

As used here, the following terms may have the following definitions:

"Pharmaceutical composition" refers to a pharmaceutical dosage form, such as a tablet, capsule, and solution, among others, generally including an active ingredient in association with inactive ingredients.

"Weight validation" refers to a process for providing a high degree of assurance that pharmaceutical compositions meet predetermined specifications related to the quantity of chemicals in the pharmaceutical compositions.

"Batch" refers to a specific quantity of a pharmaceutical composition or other material that may be intended to have uniform character and quality, within specified limits, and may be produced according to a single manufacturing order during the same cycle of manufacture.

"Lot number" refers to a distinctive combination of letters, numbers, or symbols, or any combination thereof, from which a complete history of a manufacture, processing, packing, holding, and distribution of a batch or lot of pharmaceutical composition or other material may be determined.

Description

The present disclosure relates to a method for validating pharmaceutical composition's weight, in which, after scanning a barcode, pharmaceutical compositions may be weighed and the weighing/balance information may pass to a database. Subsequently, the method may include analyzing if the pharmaceutical compositions include the correct weight. In cases where weight is incorrect, the method may include preventing the process to continue until the weight of pharmaceutical compositions has been corrected.

FIG. 1 is a block diagram of pharmaceutical composition weight validation system 100, which may include a pharmaceutical manufacturing process 102, in which, after a pharmaceutical composition may be manufactured, packaged, and a barcode has been assigned and printed on the product, a barcode scanning 104 may follow. After barcode scanning 104, the pharmaceutical composition may be weighed in a balance 106. Then, both the information from barcode scanning 104 and the weight information from balance 106 may go to a database 108, which may be connected to a user interface 110 that may permit a pharmacist to access the inventory and data from each product and ingredient in the manufactured batch, including pharmaceutical composition weights. Additionally, database 108 may save calculations and information from pharmaceutical compositions manufactured in previous batches.

Suitable barcode symbols that may work with the principles of the present disclosure include EAN/UPC, GS1 Data Matrix, GS1 Data Bar, GS1-128, ITF-14, GS1 QR Code and Composite Component, among others.

Suitable barcode scanners 104 may include a wide variety of form factors, including fixed location, hand-held, fixed/hand-held, wearable, pen-type, CCD readers, laser scanners, camera-based readers, and omni-directional, among others.

Suitable balances 106 may include Ohaus Explorer, Explorer, Pro and Voyager Pro among others.

Figure 2:
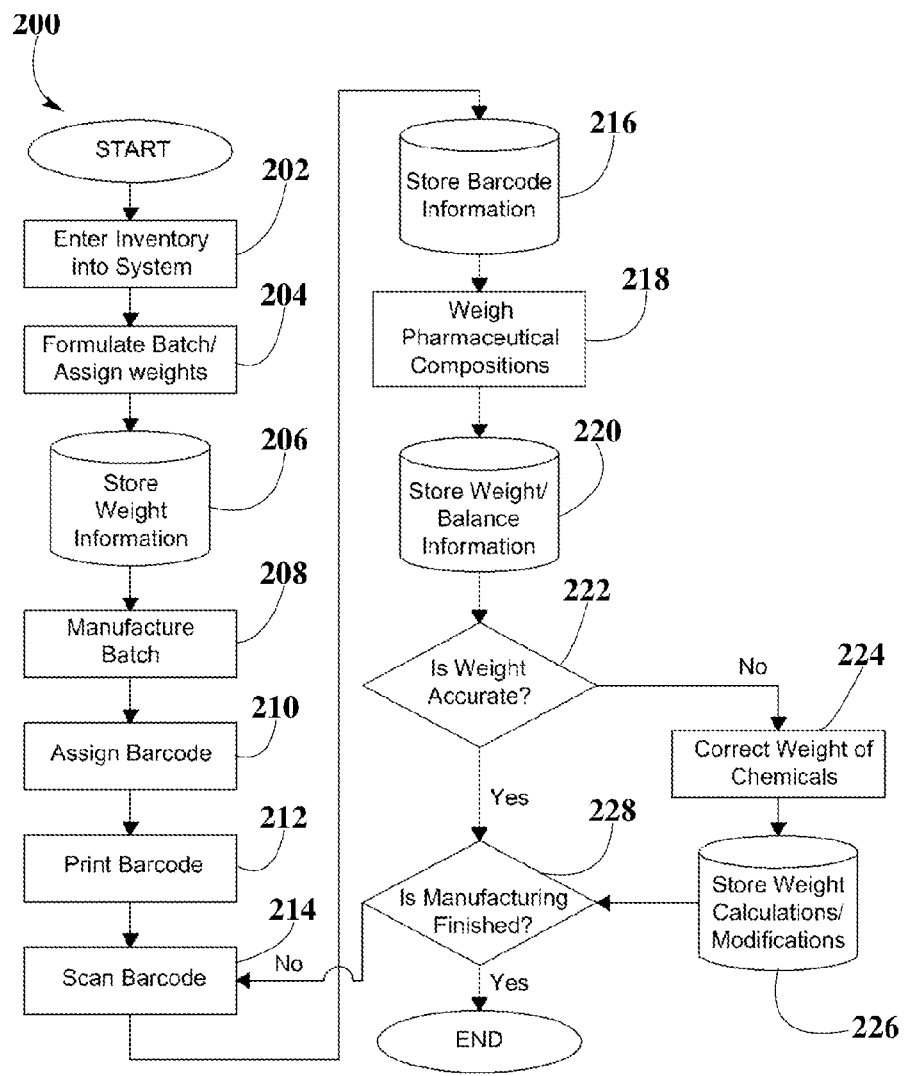
FIG. 2 is a flowchart of a method for validating pharmaceutical compositions' weight in a pharmaceutical manufacturing process, according to an embodiment.

FIG. 2 is a flowchart of a method for validating pharmaceutical compositions weight 200 in pharmaceutical manufacturing process 102. Method for validating pharmaceutical compositions weight 200 may begin when the individual pharmacist in charge of producing a batch enters inventory into the system 202, which may be performed every time inventory is received in the pharmacy. Subsequently, the individual pharmacist may formulate the batch 204, which may involve calculating and assigning a weight to each pharmaceutical composition, taking into consideration that different weight ranges may be assigned to each pharmaceutical composition. Formulating the batch 204 may depend on production planning based on individual patient prescriptions. Information gathered for each individual ingredient in pharmaceutical compositions in the batch may then be stored in database 206, after which batch manufacturing 208 may begin.

After a pharmaceutical composition is produced, method for validating pharmaceutical compositions weight 200 may assign a barcode 210 for subsequently printing the barcodes 212 on each of the individual pharmaceutical compositions. Subsequently, each barcode may be scanned 214, leading to barcode data storage 216 for data to be populated, such that a pharmacist may have access to this data in database 108 through user interface 110. The pharmacist may have access to the inventory and to all the ingredients in the individual pharmaceutical compositions, including the ingredients' original batch, location, weight, and concentrations, among others, without the need of hand-typing the lot number or other data, saving time and increasing data accuracy.

Method for validating pharmaceutical compositions weight 200 may continue by weighing pharmaceutical compositions 218, after which weight/balance information may be automatically stored 220 in database 108. Storing weight/balance information 220 may include storing the measured weight of the pharmaceutical compositions as well as storing information about the balance that was employed, including last calibration, date/time, and the serial number of the balance, among others. Subsequently, method for validating pharmaceutical compositions weight 200 may check pharmaceutical compositions weight 222, in which the measured pharmaceutical composition's weight is compared to the predetermined weight, assigned when formulating the batch 204.

When checking pharmaceutical compositions weight 222, method for validating pharmaceutical compositions weight 200 may take into account the weight ranges to which the pharmaceutical compositions have been set, such that if the difference between the measured pharmaceutical composition's weight and the predetermined weight falls within the range, no modification may have to be made. Otherwise, if the difference between the measured pharmaceutical composition weight and the predetermined value does not fall within the weight range assigned to the pharmaceutical composition, method for validating pharmaceutical compositions weight 200 may correct pharmaceutical compositions weight 224, which may include determining the quantities of chemicals that may need to be added or removed from the pharmaceutical composition in order to achieve the predetermined weight, and adding or removing the chemicals accordingly. After correcting pharmaceutical compositions weight 224, weight calculations and modifications may be stored 226 in database 108.

Finally, method for validating pharmaceutical compositions weight 200 may determine if the manufacturing process has finished 228, in which case the process may end. Otherwise, method for validating pharmaceutical compositions weight 200 may scan the barcode 214 of another pharmaceutical composition until the process may end.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for validating weight of a pharmaceutical composition, the method comprising:

providing a plurality of first weight information of each ingredient of at least one pharmaceutical composition on a non-transitory computer readable storage medium having encoded thereon computer executable instructions for providing, upon execution by at least one computing processor, at least one first batch control system;

providing a plurality of second weight information of the at least one pharmaceutical composition on the non-transitory computer readable storage medium having encoded thereon computer executable instructions for providing, upon execution by at least one computing processor, the at least one second batch control system;

associating a unique identifier for labeling manufactured product, the unique identifier correspondent to the plurality of first weight information and the plurality of second weight information;

comparing the plurality of first weight information of each ingredient of the at least one pharmaceutical composition to the plurality of second weight information of the at least one pharmaceutical composition to produce at least one first weight determination;

providing a third weight information correspondent to weight of the manufactured product; and comparing the plurality of second weight information of the at least one pharmaceutical composition to the third weight information to produce at least one second weight determination;

wherein the at least one second weight determination is the percent difference between the plurality of second weight information of the at least one pharmaceutical composition to the plurality of third weight information and providing at least one alert if the at least one second weight determination exceeds a predetermined threshold.

2. The method of claim 1, wherein the at least one first weight determination is the percent difference between the plurality of first weight information of each ingredient of the at least one pharmaceutical composition to the plurality of second weight information.

3. The method of claim 1, further comprising providing at least one first alert if the at least one first weight determination exceeds a predetermined threshold.

4. The method of claim 1, wherein the alert provides at least one correction indication related to the plurality of second weight information.

5. The method of claim 1, further comprising at least one user interface for receiving the plurality of second weight information of the at least one pharmaceutical composition.

6. The method of claim 1, further comprising at least one user interface for communicating the at least one weight determinations.

7. The method of claim 1, further comprising:
reading the unique identifier;
storing a correlation between the unique identifier and the third weight information in at least one remote database.

8. The method of claim 1, wherein the thirds weight information is derived from tarred weight of packaging associated with the manufactured product.

9. The method of claim 8, wherein third weight information further includes at least one of identification information of a balance used to collect the third weight information, when the third weight information was collected, and when the balance was last calibrated.

10. The method of claim 1, wherein the unique identifier comprises a lot number associated with a plurality of the manufactured product.

11. The method of claim 1, wherein the at least one pharmaceutical composition is selected from the group consisting of a tablet, capsule, solution and suspension.

12. The method of claim 1, wherein the at least one pharmaceutical composition comprises at least one active ingredient in association with inactive ingredients.

13. The method of claim 1, wherein the at least one second weight determination effects the at least one second batch control system.

14. The method of claim 13, wherein the effect to the at least one second batch control system is termination of a batch manufacturing process.

15. The method of claim 13, wherein the effect to the at least one second batch control system is alteration of a batch manufacturing process.

16. The method of claim 1, wherein the unique identifier is further associated with information specific to a portion of the at least one pharmaceutical composition, such information comprising at least one selected form the group consisting of the portion's origin, location, weight, and concentration.

17. The method of claim 1, wherein the at least one first weight determination effects the at least one first batch control system.

18. The method of claim 17, wherein the effect to the at least one first batch control system is termination of a batch manufacturing process.

19. The method of claim 17, wherein the effect to the at least one first batch control system is alteration of a batch manufacturing process.

20. The method of claim 1, wherein at least one of the plurality of first weight information, the plurality of second weight information, and the third weight information further include at least one of identification information of a balance used to collect the weight information, when the weight information was collected, and when the balance was last calibrated.

* * * * *